(12) United States Patent  (10) Patent No.: US 8,646,566 B1
Bouzit et al.  (45) Date of Patent: Feb. 11, 2014

(54) REMOTE MANUAL DRIVESHAFT CENTER BEARING HEIGHT ADJUSTMENT MECHANISMS

(71) Applicant: Ford Global Technologies, LLC, Dearborn, MI (US)

(72) Inventors: Djamel Bouzit, Ann Arbor, MI (US); Bill Ickes, Northville, MI (US); Ariosto Mancini, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/715,355

(22) Filed: Dec. 14, 2012

(51) Int. Cl.
*B60K 17/22* (2006.01)

(52) U.S. Cl.
USPC ........... 180/376; 180/377; 180/379; 180/380; 248/157

(58) Field of Classification Search
USPC ................ 180/376, 377, 379, 380; 254/92; 74/89.15; 248/157
See application file for complete search history.

(56) References Cited

U.S. PATENT DOCUMENTS

| | | | |
|---|---|---|---|
| 2,939,540 A | 6/1960 | Halberg | |
| 2,953,213 A | 9/1960 | Halberg | |
| 4,966,251 A | 10/1990 | Hirano | |
| 5,370,464 A | 12/1994 | Blahaa | |
| 5,562,179 A * | 10/1996 | McAdam | 180/379 |
| 5,749,659 A | 5/1998 | Nisley | |
| 6,345,680 B1 | 2/2002 | Hill | |
| 6,758,302 B2 * | 7/2004 | Penzotti | 180/383 |
| 6,782,965 B2 * | 8/2004 | Sztykiel et al. | 180/292 |
| 6,811,455 B2 | 11/2004 | Rodriguez | |
| 7,232,004 B2 * | 6/2007 | Bartel | 180/292 |
| 7,500,788 B2 | 3/2009 | Joyner | |
| 7,568,546 B2 * | 8/2009 | Bartel | 180/292 |
| 7,841,923 B2 * | 11/2010 | Marzetta et al. | 446/466 |
| 7,886,863 B2 * | 2/2011 | Marsh et al. | 180/383 |
| 7,938,221 B2 * | 5/2011 | Matsuzaki et al. | 180/352 |
| 8,070,365 B2 | 12/2011 | Hoppert | |
| 2002/0117344 A1 * | 8/2002 | Miller | 180/291 |
| 2008/0021620 A1 | 1/2008 | Johansson et al. | |

* cited by examiner

*Primary Examiner* — Toan To
(74) *Attorney, Agent, or Firm* — James Dottavio; MacMillan, Sobanski & Todd, LLC

(57) ABSTRACT

A manual height-adjustment mechanism (MHAM) for a vehicle driveshaft, includes a movable bracket assembly configured to attach to the driveshaft and a vehicle cross-member; and a user input device remotely located with respect to the movable bracket assembly, configured to control the movable bracket assembly.

18 Claims, 8 Drawing Sheets

REMOTE MANUAL DRIVESHAFT CENTER BEARING HEIGHT ADJUSTMENT MECHANISMS

TECHNICAL FIELD

The present disclosure relates to height adjustment mechanisms for vehicle driveshafts.

BACKGROUND

A vehicle driveshaft connects the transmission to a distant wheel axle. This is most commonly done in rear-wheel drive (RWD) and all-wheel drive (AWD) vehicles. The driveshaft can move vertically with respect to a vehicle frame during normal driving conditions. For example, as shown in FIGS. 1 and 2, the angular disposition of a forward section of the driveshaft rotates in different directions depending on the loading conditions of the vehicle. Driveshaft components, however, are designed to operate within a preferred angular range. Many vehicles with rear or all-wheel drive systems are designed for a standard payload so that the driveshaft is angularly disposed at a preferred position. Known suspension damping or performance characteristics can also influence this. Angle fluctuation outside of the design standard can cause objectionable vehicle shudder.

Some vehicles, such as pick-up trucks, have multi-piece drivelines mounted to the vehicle frame with a center bearing support. The driveshaft is sectioned into shorter tubes with Universal joints. The angle of at a rear most section of the driveshaft changes with axle height and center bearing height, as shown in FIGS. 1 through 3.

Several types of angle fluctuation mitigation schemes are used in the industry to manage joint angles under different operating conditions. Some methods include: (i) shimming the axle to a suspension interface; (ii) offering several center bearing bracket sizes and adapters to adjust the height to a particular engine, transmission, and axle combination; (iii) providing adjustable brackets accessible for service; or (iv) offering powered center bearing brackets or adapters to adjust the height. For example, U.S. Pat. No. 4,966,251 titled "Automotive Vehicle with Center Bearing of Propeller Shaft Assembly Variable in Position" discusses a pneumatic adjuster controlled through an electrically powered servo valve according to vehicle operating conditions. U.S. Pat. No. 6,345,680 titled "Electrically-Controlled Adjustable Height Bearing Support Bracket" discloses an electric motor that drives adjustment of the bearing support. Performance of these electrically powered systems can be limited to the narrow tuning range of known axle-suspension travel. Moreover, electrically driven systems are relatively expensive to implement and maintain, thus adding to the overall complexity and costs of vehicle manufacture and repair.

Shimming the driveshaft would not allow for a real-time or automatic adjustment of driveshaft position and shimming is limited to a tuned range of known axle-suspension travel. For example, today driveshaft positions can be tailored to fit known loading conditions for a particular user. However, when the vehicle is operated outside of the tailored use the pre-set driveshaft position is less effective.

Lastly, adjustable brackets for the driveshaft used in a service or maintenance application allow for adjustment with access to the vehicle underbody; however, this is more difficult for most users to access.

Therefore, it is desirable to have an easily accessible manual height-adjustment mechanism (HAM) for a vehicle driveshaft.

SUMMARY

The present disclosure addresses one or more of the above-mentioned issues. Other features and/or advantages will become apparent from the description which follows.

One advantage of the present disclosure is that an easily accessible manual user input device is provided with the vehicle so that the user can seamlessly make adjustments to driveshaft position without going under the vehicle. Such adjustment capability will reduce or eliminate transient noise, vibration and hardness issues, such as shudder associated with driveshaft angular fluctuation. Another advantage of such a self-contained mechanism is the ability to install the feature on the vehicle as an after-market addition by the driver or a third party. Other vehicle performance characteristics, e.g., ride and drivability can also be improved.

One exemplary embodiment of the present disclosure relates to a manual height-adjustment mechanism (or "MHAM") for a vehicle driveshaft, having: a movable bracket assembly configured to attach to the driveshaft and a vehicle frame cross-member; and a user input device remotely located with respect to the movable bracket assembly, configured to control the movable bracket assembly.

Another exemplary embodiment of the present disclosure relates to a vehicle chassis, having: a vehicle frame with cross-member; a driveshaft mounted to the cross-member via a movable bracket assembly; and a manual user input device remotely located with respect to the movable bracket assembly and configured to control the movable bracket assembly.

Another exemplary embodiment of the present disclosure relates to a method of manufacturing a vehicle chassis with user-adjustable driveshaft, including: mounting a driveshaft to a vehicle frame via a movable bracket assembly; connecting a manual user input device to the movable bracket assembly; and securing the manual user input device to a remote location with respect to the movable bracket assembly.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

DETAILED DESCRIPTION

Figure 1:
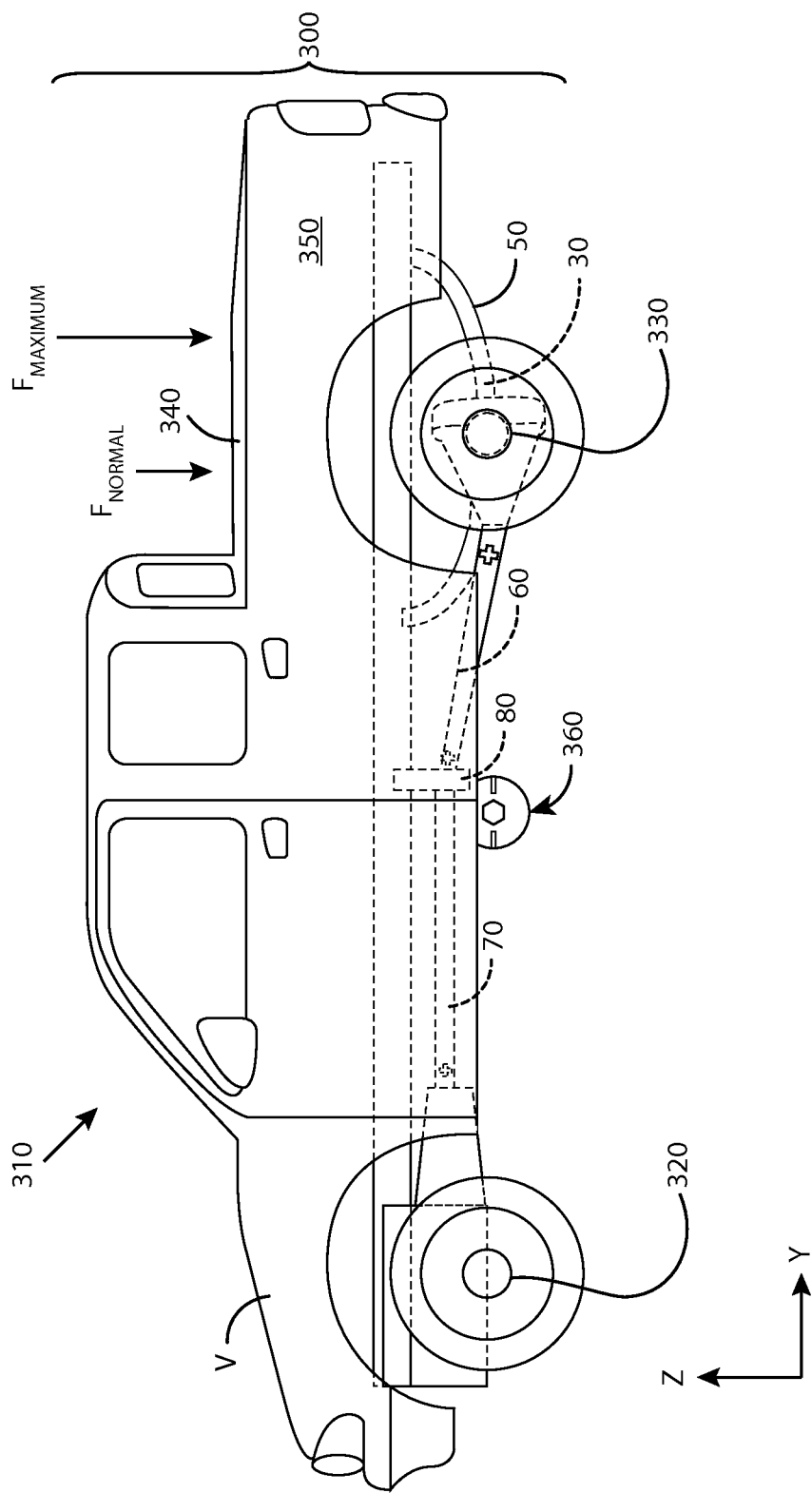
FIG. 1 is a side view of an exemplary vehicle with chassis undergoing a loading condition.

Referring to the drawings, wherein like characters represent examples of the same or corresponding parts throughout the several views, there are shown exemplary height adjustment mechanisms (or "HAMs") for a vehicle driveshaft. The illustrated HAMs provide a manual selector of driveshaft setting based on a vehicle loading conditions. A driver can actuate a manual user input device (e.g., a lever) to select a height of the driveshaft center bearing support. A pre-determined position provides optimal driveline angles for the specific load condition. The manual user input device is located remotely from the driveshaft and mounting apparatus for the driveshaft. Thus the manual user input device is remotely located with respect to the driveshaft mounting apparatus while convenient for access by the driver. For example, in the illustrated embodiments, the manual user input device is located on a side of the vehicle, integrated with the body sheet metal at a knee-high position.

The illustrated HAMs are manually operated and do not rely on electrically control or power for performance. Preferred angular dispositions between links of the driveshaft or joint angles are provided by the driver in an easy-to-use format. Several primary vehicle loading conditions are influential in the design of the driveshaft and center bearing support positions. Primary loading conditions include curb (unloaded state), design (loaded under a predetermined amount), design with loading above the predetermined amount, driving with a rear hitch mounted trailer tow attached, or driving with a $5^{th}$ wheel trailer tow attachment. There are also an endless numbers of loading conditions between these scenarios, for example, at least to the maximum loading capacity for the vehicle. Accordingly, the center bearing support for the driveshaft should be able to move up to 20 mm in some applications.

Figure 2:
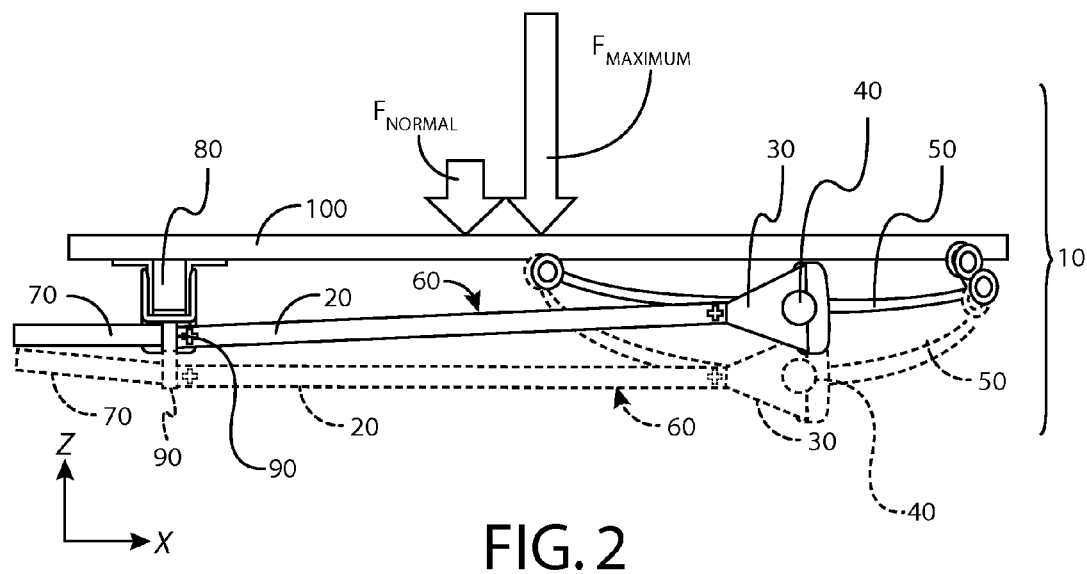
FIG. 2 is side view of the vehicle chassis of FIG. 1 under a first and second loading condition.
Figure 3:
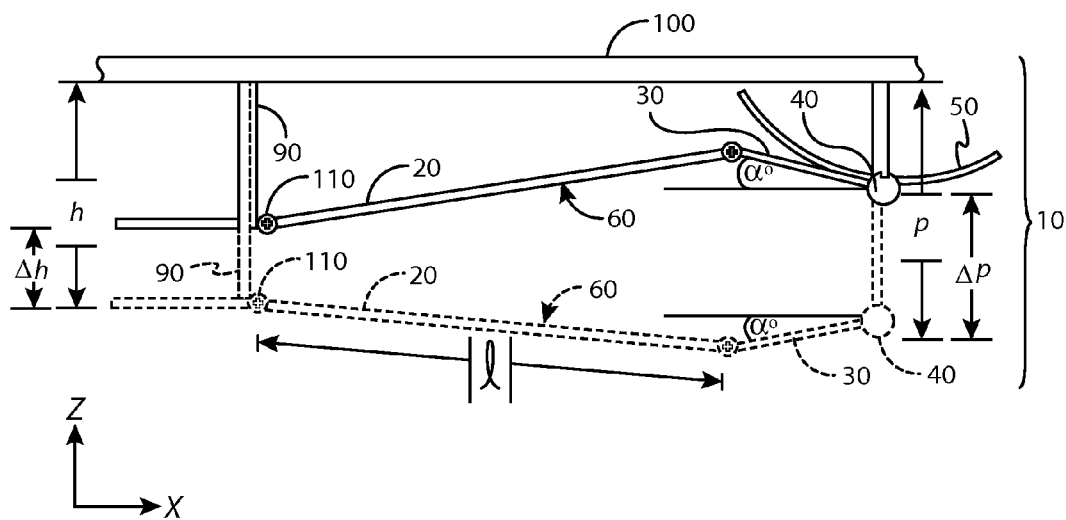
FIG. 3 is a free-body diagram of the chassis of FIG. 1.

With respect to FIGS. 1-3 a vehicle, v, includes a vehicle chassis 10 as shown in side view. The chassis 10 is subjected to two different loading conditions. In a first loading condition, $F_{Normal}$, the chassis 10 is loaded according to a normal or "curb (unloaded)" configuration—i.e., under a predetermined amount. In a second loading condition, $F_{Maximum}$, the chassis 10 undergoes substantially larger loading. The load may be, for example, a maximum loading capacity for the vehicle. The vehicle, v, can be any type of vehicle including a pick-up truck, van, sedan, coupe, sports utility vehicle, crossover or convertible. In this embodiment, vehicle is a pick-up truck. A vehicle cabin 310 sits atop a vehicle chassis (e.g., 10). Chassis 10 includes a vehicle frame having a two side rails and a cross-member. Chassis also includes a front and rear wheel axle 320, 330. Driveshaft extends between the transmission or transfer case and rear wheel axle 320, 330. In a center section of the vehicle the driveshaft is fixed to a vehicle frame. In this embodiment, vehicle is an all-wheel drive vehicle. A rear mounted differential 30 is included in the chassis. A truck bed 340 sits atop rear axle. As shown, below a side body panel 350 underneath the driver side door of vehicle there is an access port 360 for a manual user input device. Access port 360 is conveniently located at a knee-high position and discretely embedded at the edge of the body panel to blend with vehicle styling. Manual user input device is configured to control the HAMs discussed hereinbelow. Driveshaft is attached to a center section of the vehicle frame through a movable bracket assembly (or "MBA").

As shown in FIG. 2, there is a vehicle driveshaft 20 attached to a differential 30 and axle 40 for a rear-wheel drive vehicle. Vehicle can be any type of vehicle including a rear wheel drive or all-wheel drive vehicle. Differential 30 is attached to a rear axle 40 and rear axle is attached to a suspension spring 50 or suspension system. In this configuration the suspension system 50 is attached to the axle 40. Driveshaft 20 is a multiple piece or multiple link driveshaft with a universal joint at each end of each piece. A rearward portion of the driveshaft 20 is attached to the differential 30 and rear axle 40 and a forward portion of a driveshaft 20 is attached to a cross-member in the vehicle frame 80 via a center bearing support member 90.

In the first loading condition, illustrated in FIG. 2, the driveshaft 20 is shown displaced at the center bearing support 90. The center bearing support 90 for the driveshaft is attached to cross-member 80 between two vehicle side rails 100. Under the second loading condition the rear axle 40 and differential 30 move vertically downward with respect to the z-axis. The driveshaft 20 moves with the differential 30. Also, the center bearing support 90 moves downward with respect to the vertical or z-axis, as shown.

Illustrated in FIG. 3 is a free-body diagram of the vehicle chassis 10 of FIG. 2. The free-body diagram shows the driveshaft 20. The driveshaft 20 is subjected to the same loads schematically represented in FIG. 2—$F_{Normal}$ and $F_{Maximum}$. As shown in FIG. 3, the two-tube linkage of the driveshaft 20 changes angular positions under each loading condition. Differential 30 is rotated at a positive angle with respect to a longitudinal or horizontal plane of the vehicle frame 100, as indicated by alpha, $\alpha$. In this arrangement alpha is approximately 20 degrees clockwise with respect to the horizontal plane of the vehicle frame 100 or the longitudinal axis of the vehicle, x-axis. The link 60 of driveshaft is also torque upward or counterclockwise with respect to the vehicle frame 100. The universal joint angle is formed by axle rotation and driveshaft rotation. In this configuration the driveshaft 20 is in a design or in-use position. Therefore, the vehicle is under normal loading conditions.

Driveshaft 20 is supported by a center bearing support 90 that is schematically illustrated in FIG. 3. Center bearing support 90 is displaced by mechanism when the driveshaft 20 or vehicle undergoes load $F_{Maximum}$. Displacement of center bearing support 90 is shown as $\Delta h$ in the diagram of FIG. 3. In a second position the vehicle is unloaded or empty and the driveshaft undergoes what is commonly referred to as a "curb" or non-loaded position. As shown, center link 60 of driveshaft is torque approximately 20 degrees clockwise with respect to the vehicle frame, or the x-axis. Link 70 is torque approximately 20 degrees counterclockwise with respect to the vehicle frame 100. Between each link in the driveshaft 20 there are universal joints (or "U-joints") 110. The driveshaft 20 is attached to the spring suspension system 50 or leaf spring via axle 40. A change in pressure at the suspension system 50 changes the vertical position of the rear differential 30 and driveshaft 20. Change in differential position caused by a change in pressure at the suspension system 50 is denoted by $\Delta p$ in this diagram. As taught herein, adjustment of center bearing support height, $\Delta h$, with loading changes, $\Delta p$, allows the U-joint angle to be maintained at an optimal desired value.

Figure 4:
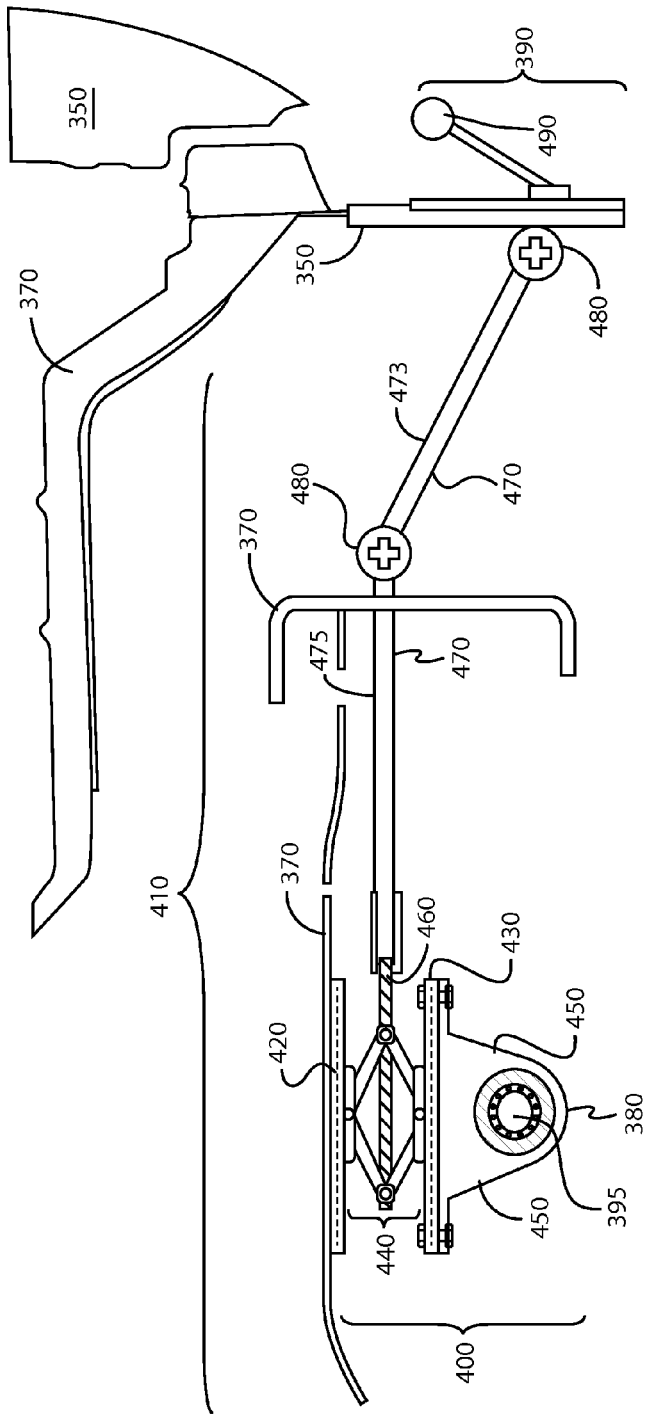
FIG. 4 is a side view of an exemplary linkage to a driveshaft height adjustment mechanism with manual input device.

The cross-member 370, as shown in FIG. 4, extends between side rails in the vehicle chassis. A center bearing support 380 for the driveshaft 395 is attached to a vehicle cross-member 370. The manual user input device 390 is located remotely with respect to the MBA 400 of the HAM 410. In this embodiment, the manual user input device 390 is mounted under a driver side door on a body panel 350 the vehicle. In this way, the manual user input device 390 is easily accessible by a user, i.e., it can be accessed at a location in which a driver normally encounters with usage of the vehicle. In other embodiments, the manual user input device is located in other locations with respect to the vehicle.

In FIG. 4, there is shown therein a side view of the HAM 410 compatible with the vehicle 300 of FIG. 3. The HAM 410 is shown in FIG. 4 isolated from the vehicle and most other components of the vehicle. At a top of the diagram there is shown the vehicle cross-member 370 that is a portion of the vehicle chassis. Attached to the cross-member 370 is a plate 420. Plate 420 is fixed and sits at a top of the MBA 400. A bottom plate 430 of the MBA 400 is movable and attached to a bottom section of a scissor jack 440 in this embodiment. Between a top plate 420 and a bottom plate 430 of the MBA is the scissor jack 440. Scissor jack 440 is configured to translate rotation of the manual user input device 390 to vertical movement of the driveshaft 395 with respect to the vehicle frame (e.g., cross-member 370). MBA 400 includes a lower plate 430 that is attached to the driveshaft 395. As shown, the driveshaft 395 is mounted with respect to a center bearing support 380. The center bearing support is attached to the plate 430 via a brace 450.

Scissor jack system 440, as shown in FIG. 4, is a cam-like member and includes a drive screw 460 that is fixed with respect to link 470. Arms of scissor jack 440 rotate with turning of the drive screw 460. Link 470 is attached to the manual user input device 390. In this embodiment, link 470 includes two sections 473, 475. Sections 473, 475 of link 470 are interconnected through a universal joint or ("U-joint") 480 so that rotation of the manual user input device 390 causes rotation of link 470 through subsections 473, 475 of link. The use of U-joints 480 in the linkage enables the installation of the manual user input device 390 in any location on the side of the vehicle where it is more convenient for a user to actuate the HAM 410. Bottom plate 430 of MBA 400 is movable with respect to top plate 420. As shown in FIG. 4, the vehicle body panel 350 defines the interior and exterior of the vehicle. The manual user input device 390 is mounted on the exterior of the vehicle. In this embodiment, the manual user input device includes a lever 490. Lever 490 is located remotely with respect the MBA 400.

Figure 5:
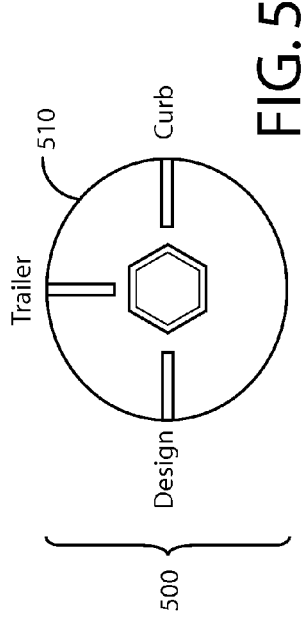
FIG. 5 is a front view of a dial for the manual input device of FIG. 4.

Now turning to FIG. 5, there is shown therein a front view of a panel 500 used with the manual user input device 390 of FIG. 4. The panel 500 of FIG. 5 demarcates predetermined settings for the manual user input device. As shown in the embodiment of FIG. 5, the manual user input device has three predetermined settings for driveshaft position. The first setting is a "Design" setting, the second is a "Trailer" setting and the third is a "Curb" setting. As mentioned, Curb is a parked or unloaded state; Design is a driving state having the vehicle loaded under a predetermined amount, and Trailer indicates driving with a trailer tow attached.

The user input device 390 is removed from panel 500 in FIG. 5. Panel includes a dial 510. Each setting is separated in this embodiment as shown. Forward rotation of the lever in the indicated position results in a height change in the position of the driveshaft that is associated with the Design setting as described above. Rotation with respect to the design position changes driveshaft height to a designated position suited for Trailer. Another rotation of the lever with respect to the design position changes the driveshaft height to a position suited for Curb. In other embodiments, fewer or more predetermined settings can be made for the driveshaft position and designated on a user panel as shown in FIG. 5. Other designations can be preset for the manual user input device, such as e.g., design with loading above the predetermined amount or driving with a $5^{th}$ wheel trailer tow attachment.

Figure 6:
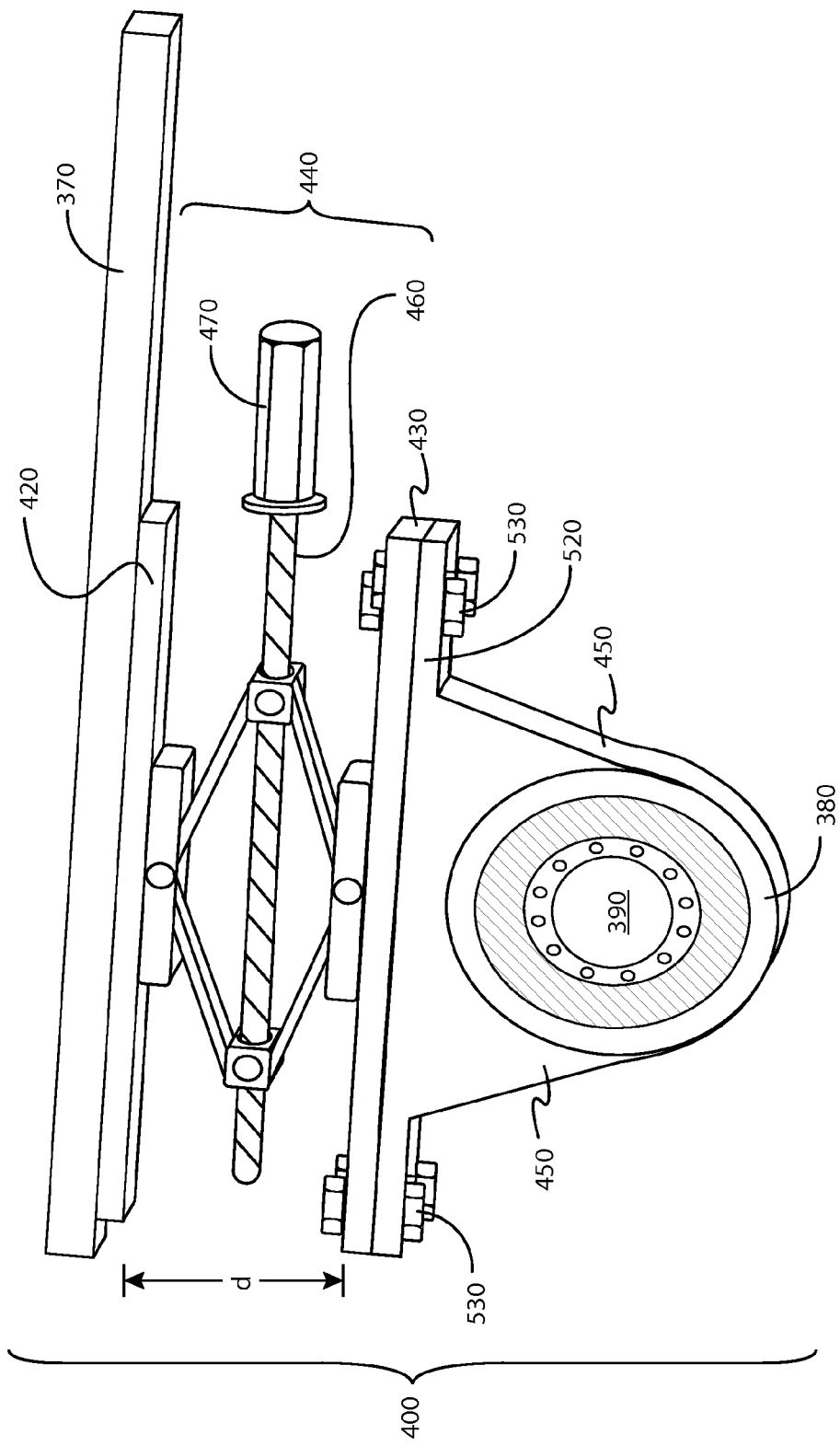
FIG. 6 is a perspective view of the driveshaft height adjustment mechanism of FIG. 4.

Now turning to FIG. 6, there is shown there in a perspective view of the MBA 400 of FIG. 4. The MBA 400 is isolated from the HAM 410 of FIG. 4. With the embodiment of FIGS. 4-6, rotation of the lever 490 clockwise translates to upward movement of driveshaft 395 with respect to cross member 370. In that case, a distance, d, between plates 420 and 430 decreases. Rotation counterclockwise of link 470 causes an increase in the distance, d, between fixed plate 420 and plate 430 of the MBA 400 and the driveshaft 395 is lowered with respect to the vehicle cross-member 370. Top plate 420 and bottom plate 430 are slidably attached to each other through a sleeve and guide post. Plates are configured to slide with respect to each other as the scissor jack system vertically moves plates. In other embodiments, the link 470 can be rotated either clockwise or counterclockwise to produce a height change in driveshaft position.

Driveshaft 395 is mounted with respect to a center bearing support 380 that is fixed to plate 430 through a brace 450 as shown in FIG. 6. A top section 520 of brace 450 is attached to bottom plate 430 of MBA 400 through bolt 530. A drive screw 460 is included in the scissor jack 440. Drive screw 460 is fixedly attached to link 470.

Figure 7:
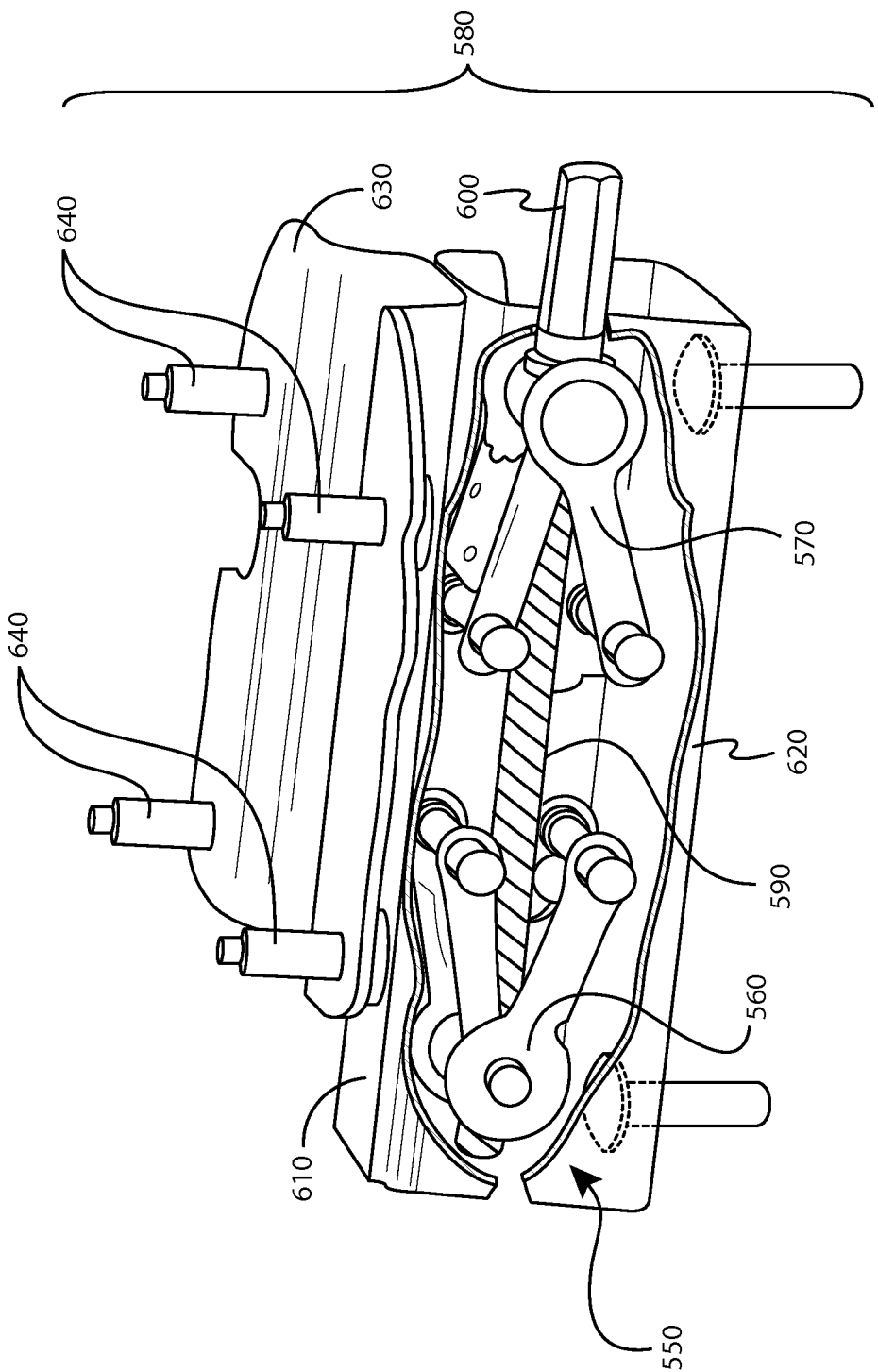
FIG. 7 is front, partial cut-away perspective view of another exemplary driveshaft height adjustment mechanism.
Figure 8:
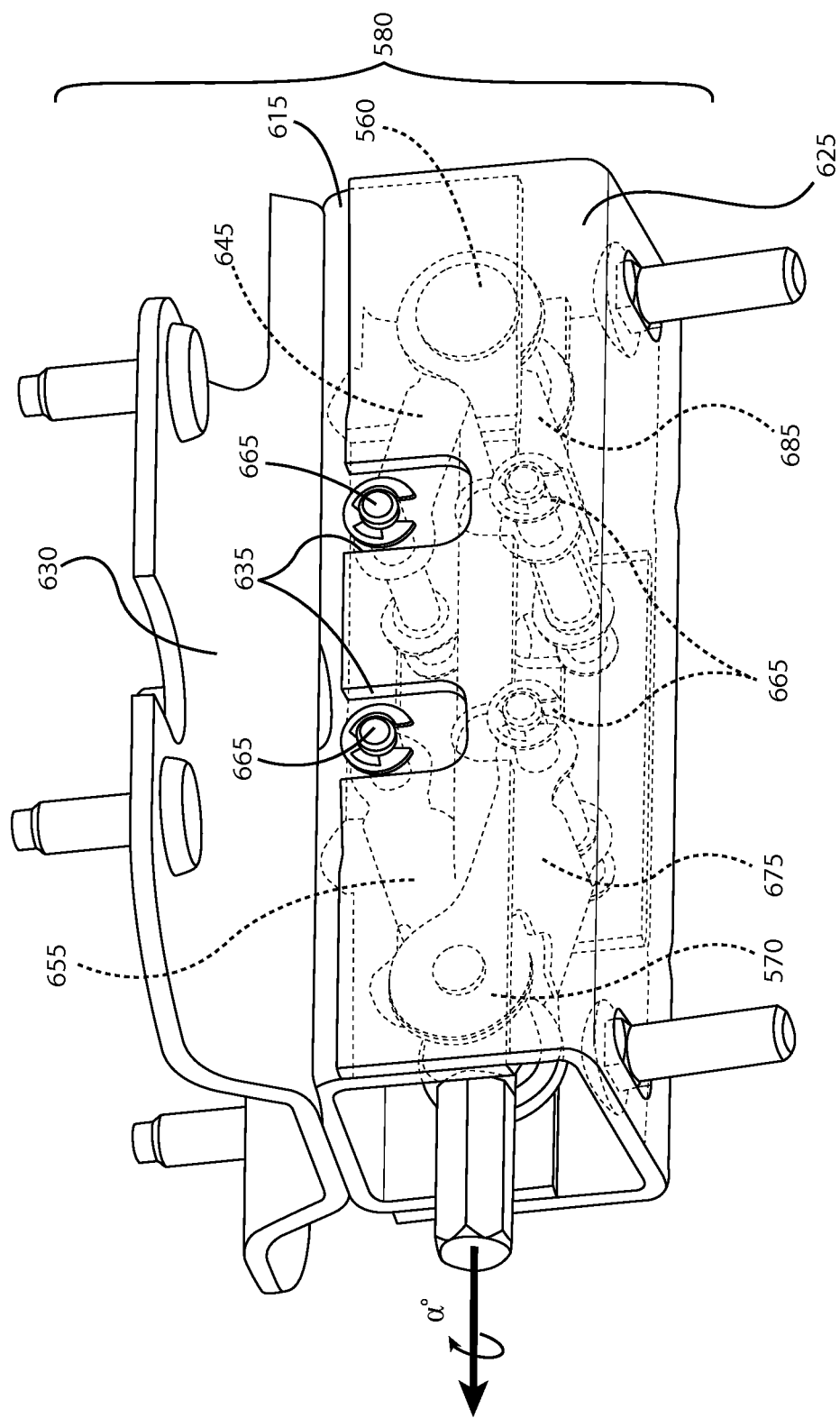
FIG. 8 is a rear perspective view of the driveshaft height adjustment mechanism of FIG. 7.

Referring now to FIG. 7, there is shown an alternative embodiment of a movable bracket assembly (or MBA) 580. MBA includes a scissor jack system 550. The scissor jack system 550 includes two sets of arms 560, 570 that are pivotable with respect to link 600. A drive screw 590 is attached to each set of arms 560, 570 and fixed to a link 600. Rotation of link 600 causes vertical movement of arms 560, 570 with respect to a top and bottom plate 610, 620 of the MBA 580. Plates are a part of separate brackets that sandwich the scissor jack system 550, as shown in FIG. 8. Bracket 615 is configured to slide with respect to bracket 625. A groove 635 is formed in bracket 625. A top arm 645, 655 on each set of arms is attached to bracket 615 through a fastener 665. Groove 635 is formed allow fastener 665 to slide therein when the brackets 615 and 625 are positioned closer to each other. A bottom arm 675, 685 on each set of arms 560, 570 is attached to bracket 625 through fasteners 665. Bracket 615 is also configured to rotate with respect to bracket 625. The pitch of bracket 615 with respect to bracket 625 is expressed as, $\alpha$, alpha in FIG. 8.

Another top-mounted bracket 630, as shown in FIGS. 7 and 8, is included with the MBA 580 to secure to plate 610 and attach to a vehicle chassis (e.g., 370 as shown in FIG. 4) through bolts 640. Bottom plate 620 of FIG. 7 is fixed to a center bearing support or brace for the driveshaft (e.g., 380 or 450 as shown in FIG. 4). Other scissor jacks can be used with the moveable bracket assemblies discussed herein.

Figure 9:
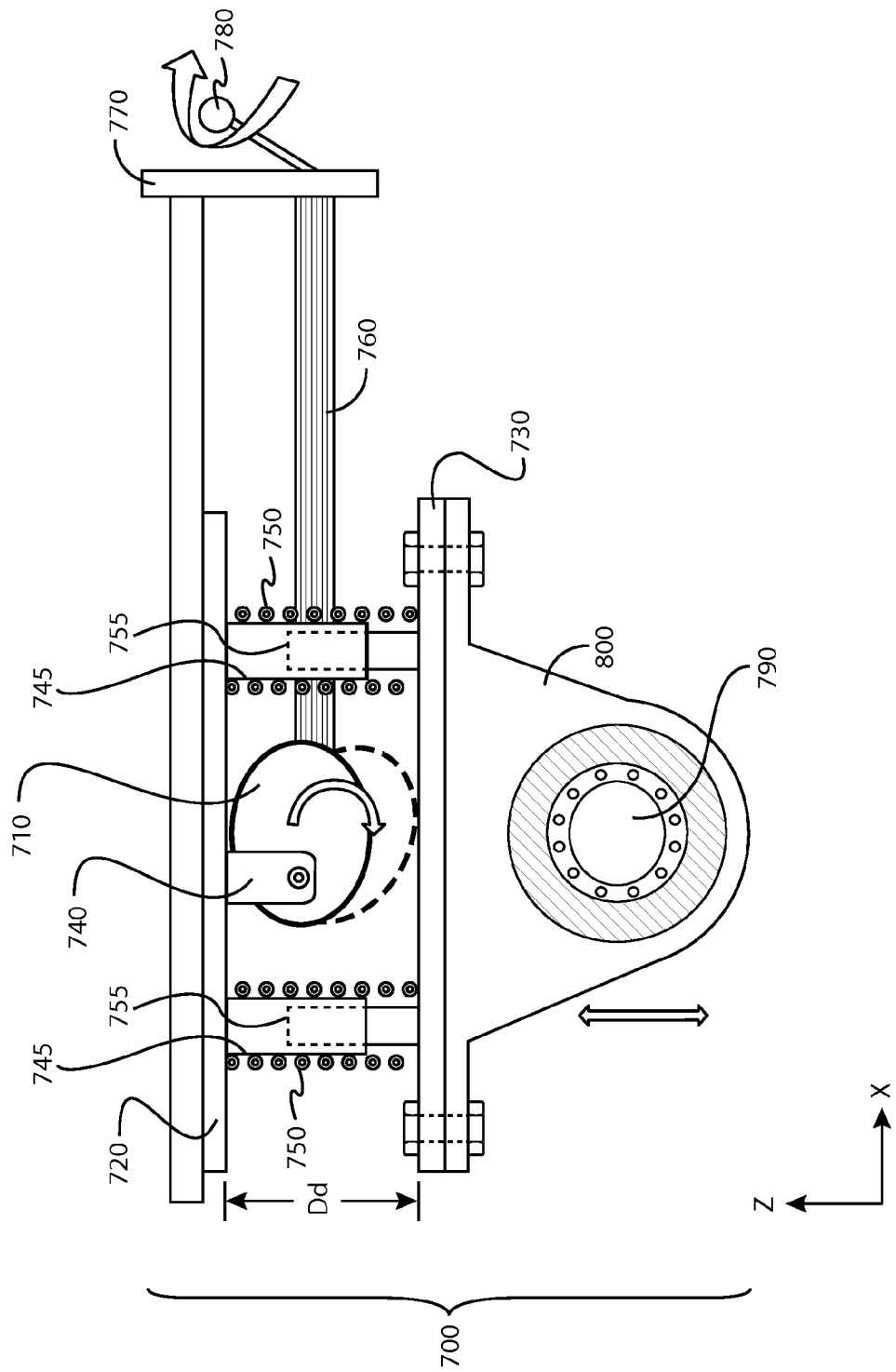
FIG. 9 is a side view of another exemplary driveshaft height adjustment mechanism with manual input device.

Now turning to FIG. 9, there is shown therein a side view of a different MBA 700. MBA 700 includes a cam 710 between the fixed top and moving bottom plate 720, 730 of the MBA 700. Cam 710 is an oblong object, pivotally attached with respect to a brace 740 fixed to the top plate 720 of the MBA 700. Rotation of cam 710 clockwise causes an increase in distance between plate 720 and plate 730 of the MBA 700. Rotation of cam 710 counter-clockwise decreases a height differential, delta d, between the plates 720, 730 of a MBA 700. A second position for the cam 710 is shown in phantom. A set of two return springs 750 are attached to the frame of MBA 700. The top and bottom plates stay connected through four guide pillar and pin sets configured to slide with respect to each other as the cam separates them when link 760 is turned. Guide pins 755 are inserted in the guide pillars 745, as shown in FIG. 9. Springs 750 are configured to provide a force pushing plates 720, 730 away from each other when compressed. Cam 710 is linked to a MBA 700 through link 760. Link 760 is mounted to a side body panel 770 of the vehicle. In this embodiment, clockwise rotation of a lever 780 with respect to a lateral axis, x-axis, of the vehicle causes downward movement of plate 730 of the MBA 700 with respect to plate 720. A driveshaft 790 is attached to plate 730 through a center bearing housing 800.

Figure 10:
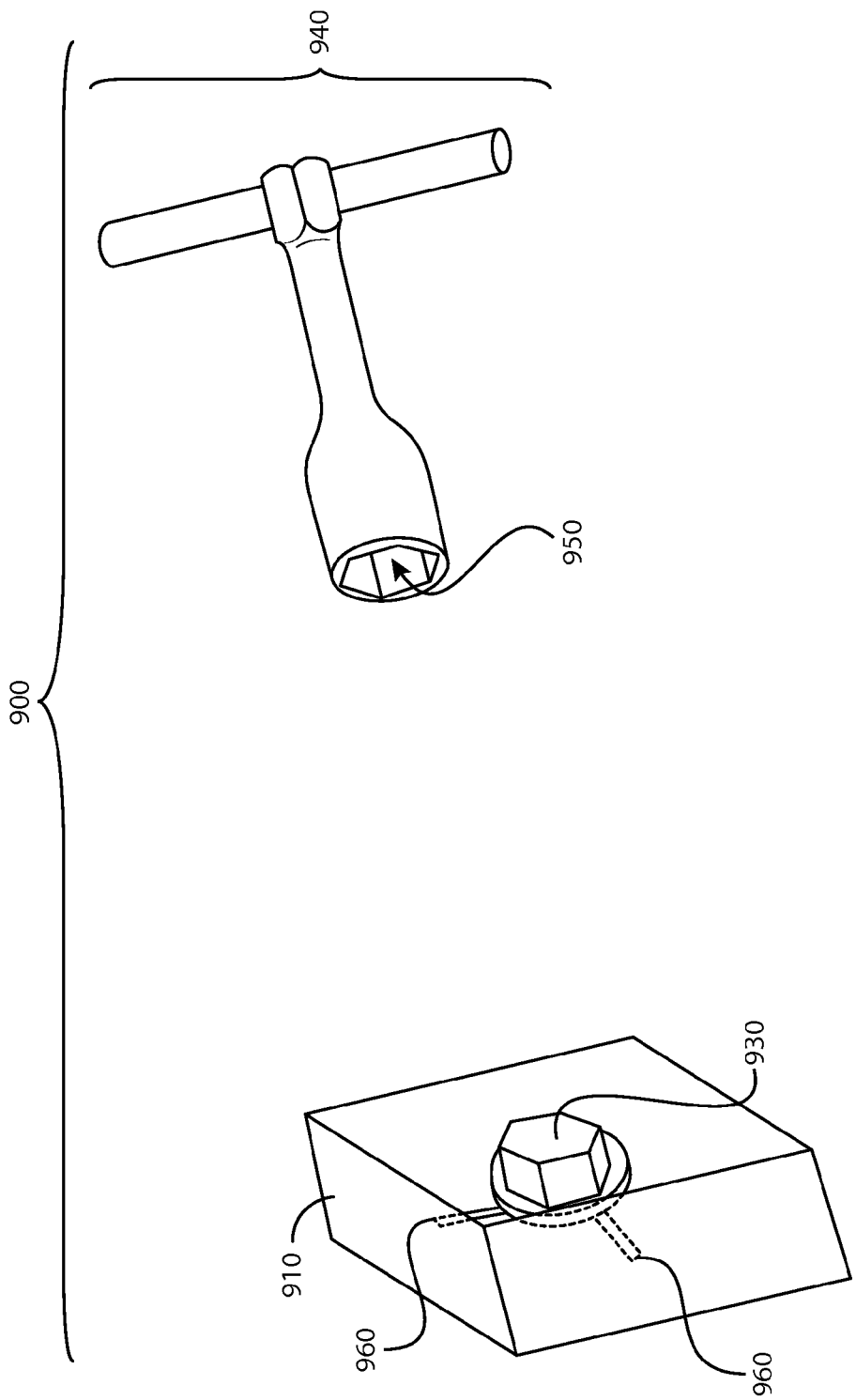
FIG. 10 is a perspective view of another exemplary manual user input device.

Now turning to FIG. 10, there is shown therein a manual user input device 900 that can be positioned externally with respect to the vehicle. The manual user input device is stowed in a vehicle bottom of the side panel 910. The user input device 900 is externally located with respect to the vehicle. In this embodiment, the device includes a nut 930 fixed with respect to a link, e.g., 470 as shown in FIG. 4. The manual user input device 900 is compatible with a wrench 940, as shown. Wrench 940 is also compatible with wheel lug nuts, is detachable from nut 930. Panel 920 includes designated settings 960 for rotation of nut 930 with respect to height positions of the driveshaft.

Components of the HAMs illustrated herein can be composed of any type of material including, for example, aluminum, magnesium, titanium, steel or a polymer or polymer composite. Components can be formed using known forming techniques such as, e.g., machining, stamping, injection molding, casting, or hydroforming.

A method of manufacturing a vehicle chassis with user-adjustable driveshaft includes the following steps: (i) mounting a driveshaft to a vehicle frame via a movable bracket assembly; (ii) connecting a manual user input device to the movable bracket assembly; and (iii) securing the manual user input device to a remote location with respect to the movable bracket assembly. The method can include connecting the manual user input device to the movable bracket assembly and adding a link between the movable bracket assembly and manual user input device. As shown, for example, in FIG. 4 the link can be configured to translate rotation at one end to rotation at another end through U-joints. As shown in the illustrated embodiments, the method of manufacturing can include incorporating a scissor jack system between a first and second plate of the movable bracket assembly and connecting the manual user input device to the scissor jack system so as to be configured to control the scissor jack system. The first plate is connected to the vehicle frame and fixed thereto; the second plate is connected to a driveshaft bearing support. The second plate is slidably attached to the first plate.

In another exemplary embodiment, the method of manufacturing includes adding a lever to the manual user input device. A nut at one end of the link can be attached to the link to be compatible with a socket wrench (e.g., as shown in FIG. 10).

In another version of the method of manufacturing, the method includes incorporating a cam between a first and second plate of the movable bracket assembly; and connecting the manual user input device to the cam in a manner to control the cam. An exemplary cam is shown in FIG. 9. The first plate is connected to the vehicle frame. The second plate is connected to a driveshaft bearing support. The second plate is slidably attached to the first plate. In one embodiment a return spring is incorporated between the driveshaft and vehicle frame, e.g., 750 as shown in FIG. 9. A lever can be added to the manual user input device or a nut at one end of the link, compatible with a lug wrench. The method can include configuring the manual user input device with a plurality of predetermined settings—e.g., design, trailer and tow as indicated in FIG. 5.

Those familiar with the art to which this invention relates will recognize various alternative designs and embodiments for practicing the invention within the scope of the appended claims.

We claim:

1. A manual height-adjustment mechanism (MHAM) for a vehicle driveshaft, comprising:
    a movable bracket assembly configured to attach to the driveshaft and a vehicle frame cross-member, a first plate connected to said cross-member, and a second plate slidably attached to the first plate and connected to a driveshaft bearing support;
    a user input device remotely located with respect to the movable bracket assembly, configured to control the movable bracket assembly;
    a link between the movable bracket assembly and the user input device;
    a scissor jack system between the first and second plates, connected to the user input device through the link, wherein the user input device is configured to control the scissor jack system.

2. The MHAM of claim 1, wherein the first plate is included in a first bracket;
    wherein the second plate is included in a second bracket;
    wherein the scissor jack system includes a first arm attached to the first bracket and a second arm attached to the second bracket;
    wherein the first and second arm are configured to move the first and second bracket with respect to each other when the link is turned.

3. The MHAM of claim 1, wherein the movable bracket assembly includes:
    a cam between the first and second plate, connected to the user input device through the link;
    wherein the second plate is slidably attached to the first plate;
    wherein the user input device is configured to control the cam.

4. The MHAM of claim 3, wherein the first plate is attached to a guide pillar;
    wherein the second plate is attached to a guide pin insertable in the guide pillar;
    wherein the cam is configured to move the guide pin with respect to guide pillar when the link is turned.

5. The MHAM of claim 4, further comprising:
    a return spring between the first plate and second plate.

6. A vehicle chassis, comprising:
    a vehicle frame with cross-member;
    a driveshaft mounted to the cross-member via a movable bracket assembly;
    a manual user input device remotely located with respect to the movable bracket assembly and configured to control the movable bracket assembly;
    a link between the movable bracket assembly and the manual user input device;
    a first plate connected to the cross-member;
    a second plate connected to a driveshaft bearing support and movable with respect to the first plate;
    a scissor jack system between the first and second plates, connected to the manual user input device through the link, wherein the manual user input device is configured to control vertical movement of the scissor jack system.

7. The chassis of claim 6, wherein the link includes a nut at one end; and wherein the manual user input device includes a wrench, compatible with the nut.

8. The chassis of claim 6, wherein the movable bracket assembly includes:
 a cam between the first and second plate, connected to the manual user input device through the link;
 wherein the second plate is slidably attached to the first plate;
 wherein the manual user input device is configured to control the cam.

9. The chassis of claim 8, wherein the cam is a rounded plate, pivotally attached to the cross-member.

10. The chassis of claim 6, wherein the manual user input device is configured to have a plurality of predetermined settings.

11. The chassis of claim 6, wherein the link is configured to translate rotation at one end to rotation at another end.

12. A method of manufacturing a vehicle chassis with user-adjustable driveshaft, comprising:
 mounting a driveshaft to a vehicle frame via a movable bracket assembly;
 connecting a manual user input device to the movable bracket assembly by adding a link therebetween, the link configured to translate rotation at one end to rotation at another end; and
 securing the manual user input device to a remote location with respect to the movable bracket assembly.

13. The method of claim 12, further comprising:
 incorporating a scissor jack system between a first and second plate of the movable bracket assembly; and
 connecting the manual user input device to the scissor jack system so as to be configured to control the scissor jack system;
 connecting a first plate to the vehicle frame;
 connecting a second plate slidably attached to the first plate to a driveshaft bearing support.

14. The method of claim 13, further comprising:
 adding a lever to the manual user input device.

15. The method of claim 12, further comprising:
 incorporating a cam between a first and second plate of the movable bracket assembly; and
 connecting the manual user input device to the cam in a manner to control the cam.

16. The method of claim 15, further comprising:
 adding a lever to the manual user input device.

17. The method of claim 15, further comprising:
 adding a nut at one end of the link, compatible with a lug wrench.

18. The method of claim 12, further comprising:
 configuring the manual user input device with a plurality of predetermined settings.

* * * * *